(12) United States Patent
Stagni

(10) Patent No.: US 6,595,245 B1
(45) Date of Patent: Jul. 22, 2003

(54) METHOD AND A MACHINE FOR METERING PRODUCTS, IN PARTICULAR LIQUIDS, AND FOR FILLING CONTAINERS WITH THE METERED PRODUCTS

(76) Inventor: Milena Stagni, Via Renazzo 63, 44100 Renazzo di Cento (Ferrara) (IT)

( * ) Notice: Subject to any disclaimer, the term of this patent is extended or adjusted under 35 U.S.C. 154(b) by 0 days.

(21) Appl. No.: 09/890,370

(22) PCT Filed: Jan. 31, 2000

(86) PCT No.: PCT/IB00/00099

§ 371 (c)(1),
(2), (4) Date: Jan. 4, 2002

(87) PCT Pub. No.: WO00/46103

PCT Pub. Date: Aug. 10, 2000

(30) Foreign Application Priority Data

| Feb. 2, 1999 | (IT) | ................................... | BO99A0046 |
| Mar. 1, 1999 | (IT) | ................................... | BO99A0087 |
| May 4, 1999 | (IT) | ................................... | BO99A0214 |
| Nov. 24, 1999 | (IT) | ................................... | BO99A0636 |

(51) Int. Cl.$^7$ ................................................ B65B 3/30
(52) U.S. Cl. ........................ 141/1; 141/94; 141/146; 141/152; 141/324; 222/168.5; 222/305; 222/440
(58) Field of Search ........................ 141/1, 94, 146, 141/152, 177, 181, 324; 222/168.5, 305, 424.5, 438, 440

(56) References Cited

U.S. PATENT DOCUMENTS 1,483,861 A    2/1924   Heulings

| 1,868,244 A |   | 7/1932 | Mudd |
| 2,466,731 A | * | 4/1949 | Nordquist ..................... 141/94 |
| 3,270,784 A |   | 9/1966 | Mistarz |
| 5,125,440 A | * | 6/1992 | Mette ......................... 141/39 |
| 5,224,526 A |   | 7/1993 | Mette et al. |

FOREIGN PATENT DOCUMENTS

| BE | 523137  | 10/1953 |
| DE | 2257449 | 5/1974  |
| FR | 2182616 | 12/1973 |
| GB | 336975  | 10/1930 |

* cited by examiner

*Primary Examiner*—Gregory Huson
*Assistant Examiner*—Peter deVore
(74) *Attorney, Agent, or Firm*—William J. Sapone; Coleman Sudol Sapone, P.C.

(57) ABSTRACT

According to a method for filling containers (2) with a metered quantity of products (10), the products is supplied to a reservoir (3), inside which there is a metering receptacle (7). In its upper part, the metering receptacle (7) is open and its lower part features a discharge pipe (8), which communicates with a container (2) to be filled. A moving element (13) moves between a filling position in which it causes the raising of level of the products (10) over the opening (7a) of the metering receptacle (7), so that the latter is filled with the products and a non-filling position, in which the level of the products (10) is lowered below the opening (7a) of the metering receptacle (7). Thus a metered quantity (11) of products is collected inside the metering receptacle (7) The metered quantity (11) of products is delivered to the container (2) through the discharge pipe (8), by opening of valve means (9).

19 Claims, 12 Drawing Sheets

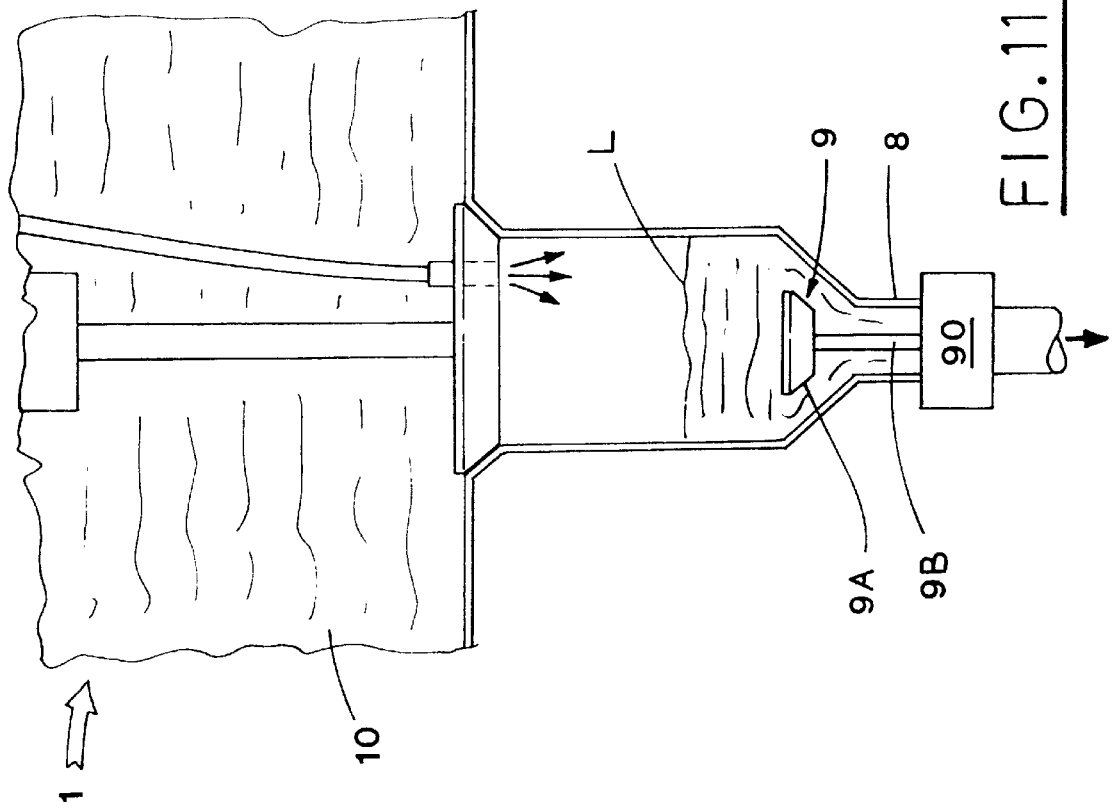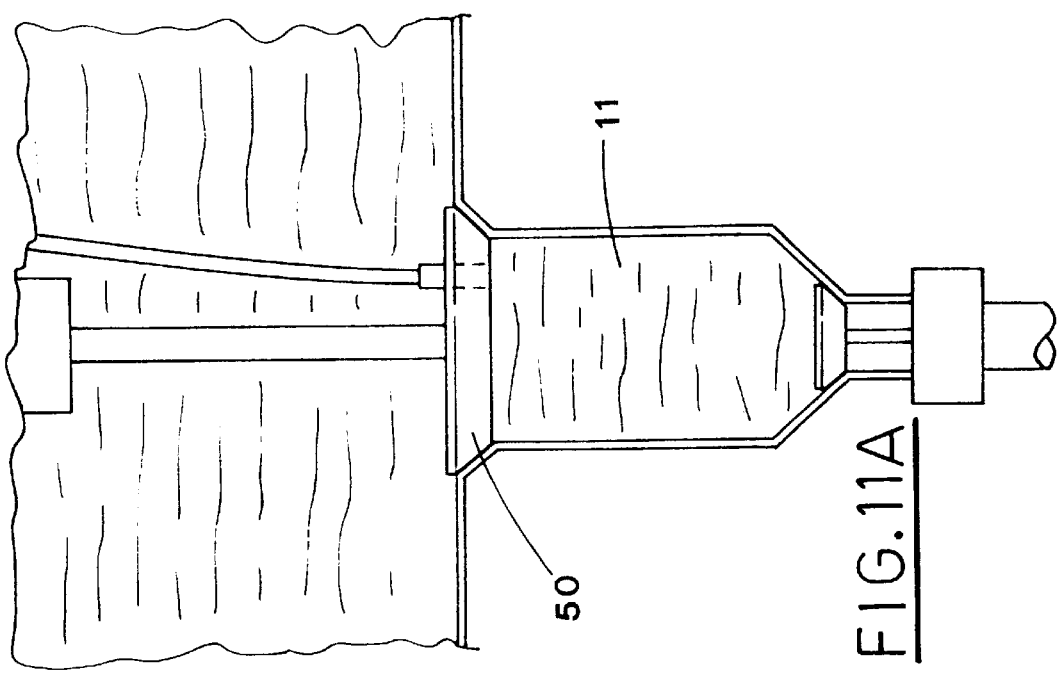

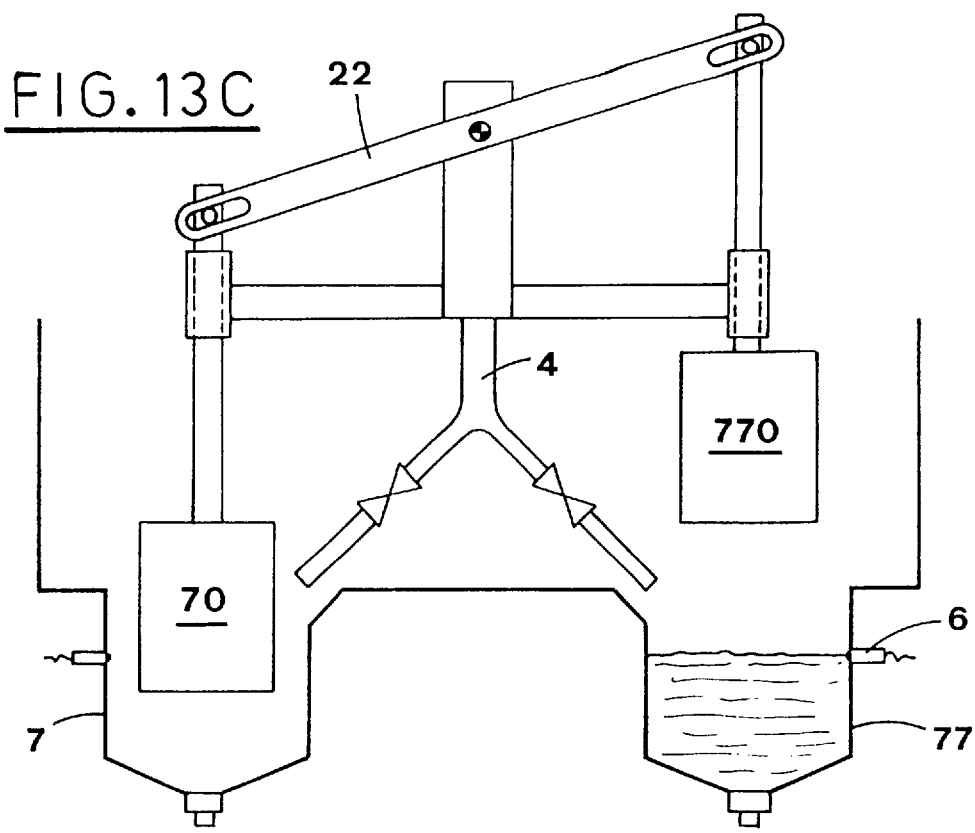
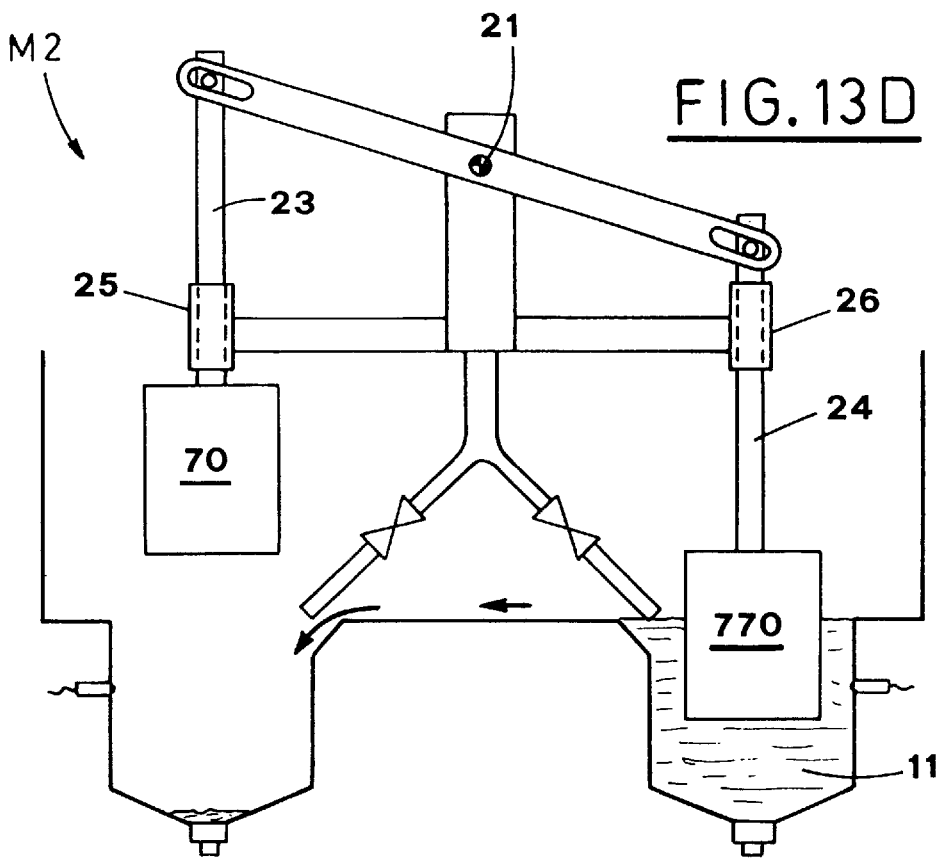

METHOD AND A MACHINE FOR METERING PRODUCTS, IN PARTICULAR LIQUIDS, AND FOR FILLING CONTAINERS WITH THE METERED PRODUCTS

BACKGROUND OF THE INVENTION

The present invention relates to metering products, in particular liquid product, and to filling containers with the metered products.

DESCRIPTION OF THE PRIOR ART

In many production fields, e.g. the chemical-pharmaceutical industry, food, cosmetic and other industries, containers, e.g. bottles, must be filled with a metered quantity of products, in particular a liquid product.

According to regulations in force in different countries, a predetermined minimum nominal net weight, as well as a predetermined difference margin, should be indicated on the package.

Many solutions have been heretofore used in different machines for metering liquid product and for filling the containers.

According to one of the known methods, a constant volume of liquid product, obviously corresponding to the required nominal net weight, is determined considering the product density.

The metered quantity of product is introduced into the containers by suitable delivering means, e.g. nozzles.

The container is weighed before the filling and after the filling, in order to control if the metered volume is constant and to define tare and gross weights.

The values obtained by the above mentioned weighing operations are processed by a suitable electronic unit, which calculates the effective net weight of the liquid product introduced into the container.

If the obtained effective weight of product is lower than the minimum acceptable weight, suitable additional delivering means introduce another portion of liquid product, constant or proportional to the error entity.

However, according to this solution, the final weight of the liquid product introduced into the container is not measured again, therefore, the volume of the introduced product is not guaranteed.

One of the disadvantages of the known machines derives from the inevitable wearing out of liquid delivering means and the feeding means joined thereto.

This results in the need of further volume correction, e.g. by introduction of another quantity of liquid through the above mentioned additional delivering means.

Analogous problems of volume variation are connected with possible temperature variations, particularly if the product density is considerably influenced by the temperature.

According to another known method, the containers are filled until a predetermined level by delivering means provided with suction means working in the area of the filling level.

However, this solution does not guarantee a constant volume in case of containers having different cross sections.

According to still another method, the liquid product is delivered in two subsequent steps.

During the first step, the containers are filled with a relatively high speed, but not completely, while during the second step, the containers are filled slowly until the predetermined net weight is obtained.

The apparatuses carrying out the above mentioned method are usually rather complicated and their working time is long.

These apparatuses usually include a plurality of working groups, which weigh, in time relation, the containers, so as to determine the tare weight, and deliver liquid products.

The Belgian Patent No. 901.407 claims a method for filling containers, which includes measuring the tare weight of the single container, in a first weighing station; transferring of this container to an initial filling station, where the product is delivered until 90% of nominal net weight is obtained; measuring of the gross weight of the partially filled container in a second weighing station; transferring of the partially filled container into a final filling station, where the filling is completed by delivering an additional quantity of product, which is determined by processing means, supplied with data obtained by the above mentioned measuring operations.

However, this method does not include controlling of the additional quantity of delivered product, therefore, it is not possible to correct possible variations deriving from e.g. problems of the delivering pump.

According to yet another method, a liquid product is delivered to the containers for a predetermined period of time, at a constant flow rate, so as to deliver a quantity of liquid products proportional to the delivery time.

The above mentioned method is carried out by machines, which include a liquid feeding reservoir, inside which there is pressure realized by a suitable gas.

A feeding channel, extending from the reservoir, has a delivery nozzle at its end and is equipped with a valve means, which is activated by timer means.

The drawbacks of this solution derive from the lack of precision resulting from a gradual reduction of level in the feeding reservoir and from a consequent variation of the delivery pressure, which influences the flow rate.

This disadvantage is sometimes outweighed by gradual increase of liquid delivery time, however, it does not guarantee the introduced quantity, since the weight of the product really introduced into the containers is not determined.

There are also other methods, different from the just described, or combining some of their characteristics.

The Italian Patent application No. 3546A/87 claims a method for batching products by subsequent corrective deliveries in relation to weight checks, which includes the transferring of the containers through subsequent delivering stations, alternate with weighing stations. In each delivering station an additional quantity of product is delivered in relation to the weight check carried out in the previous weighing station. In the final delivering station, a further correction is carried out, some quantity of product is added or taken away, depending if the final obtained weight is smaller or bigger than the nominal one.

The U.S. Pat. No. 5,156,193 claims a method for filling containers, which includes: measuring of the container tare weight in a first weighing station; filling of this container with liquid product in a delivering station; measuring of the full container weight in a second weighing station; processing of the data coming from the above mentioned weighing stations, as well as of the data concerning the pressure and temperature of the delivered products, in order to determine the delivery time necessary for filling the subsequent container up to nominal net weight within an acceptable variation.

The German Patent No. DE 2660164 discloses a method for metering liquid product, which uses a metering container submerged in the liquid to be delivered to the containers, inside a suitable reservoir.

The metering container moves vertically, so as to engage, during its upward stroke, a perforated plug, which communicates axially with a nozzle connected to a liquid product discharge pipe.

The inner volume of the metering container defines the metered quantity sent to the container, as a consequence of the relative movement between the metering container and the plug acting as a piston.

However, this solution features considerable drawbacks resulting from tightness and wear of the parts which are in contact with liquid product, in particular the nozzle.

Consequently, different methods used so far for filling containers with liquid product and the like, usually require complicated machines, because of the presence of a series of weighing stations and a series of delivering means, which results in higher maintenance costs, in particular for cleaning and substitution of worn parts.

Moreover, these machines usually do not guarantee the metering precision.

Another disadvantage of the above mentioned machines is encountered during change over operation, which requires change of the metered quantity of products. The change over usually requires complicated operations for replacement of the parts involved in the filling process.

According to a device known in the art, shown in FIGS. 1 to 4, a reservoir 3 is fed with the liquid product 10 to be introduced into containers 2. The reservoir 3 is periodically supplied by a suitable supply duct 4, so as to maintain constantly the product level within the range defined by sensor means 5 and 6.

A metering receptacle 7, open at the top, is situated inside the reservoir 3. A movable element 13 moves first to a filling position, in which it is lowered into the liquid product 10 contained in the reservoir 3, so as to raise the level of the product 10 over the opening 7a of the metering receptacle 7.

Then the element 13 moves to a raised non-filling position, in which the level of the liquid product goes down below the above mentioned opening 7a and a metered quantity 11 of liquid product is collected inside the metering receptacle 7.

Lastly, the metered quantity of liquid product 10 is delivered to the container 2, which is dwelling under the metering receptacle 7, by connecting the container with the relative discharge pipe 8, which is for instance extendible (FIG. 4).

The prior art method includes a periodical feeding of liquid product 10 to the reservoir 3, so as to maintain the level of the liquid product 10 within a pre-determined range defined by the level sensors 5, 6.

In accordance with this known method, document BE-523,137 discloses a device for filling a plurality of containers, in which metering vessels are placed inside a basin filled with liquid product up to a level lower than the rims of the vessels. A plunger is dipped into the liquid product to raise the level over the rims of the vessels, which are filled. Then the plunger is raised up again and the liquid contained in the is delivered to the containers dwelling under the metering vessels.

Document FR-2,182,616 describes a machine for filling containers, in which a series of metering vessels are periodically filled with liquid product until the product overflows therefrom. The liquid overflown is collected into containers placed at both sides of the machine and connected to each other by a plane through which the metering vessels pass. The liquid contained in the vessels is delivered to the containers to be filled.

A series of plunger are inserted in the metering vessels to adjust the capacity thereof in accordance with the size of the container to fill.

Also document U.S. Pat. No. 5,224,526 uses a series of plungers to change the capacity of metering chambers by inserting the plungers more or less into the chambers. The chambers are then periodically filled with liquid product from a tank which is at a lever over the rim of the metering chambers, so that the liquid product overflows therefrom and is collected by collecting tubes surrounding the metering chambers and leading to a collecting reservoir.

The prior art methods fulfill the object of filling the containers with a metered quantity of liquid product, ensuring the exact correspondence of the this metered quantity to the predetermined nominal value.

In fact, the definition of the metered quantity is given by the volume of the metering receptacle or vessels. Basically, the quantity of liquid product delivered to each container is exactly the volume of the metering receptacle or vessel. Slight variations are obtained by inserting more or less a plunger in the metering receptacle or vessel.

It should be noted that keeping the level within a defined range, which is necessary in those machine which use a plunger to raise the level of the liquid to fill the metering receptacles, brings about some disadvantages.

First, the need of two level sensors, one for the maximum level and one for the minimum level. This means a more complicated control of the device operation.

Second, the amount of liquid flowing into the metering receptacles or vessels depends on the volume of the plunger, and also the amount of liquid to be delivered is limited by the dimension of the whole container. The dimension of the machine shall be increased to allow filling containers of a wide size range.

Moreover, none of the prior art methods discloses the use of the plunger to periodically define the volume of the liquid inside the metering receptacle or vessel, each time the receptacle or vessel is filled. This means that the plunger is not an active member of the device, while acting inside the metering receptacle or vessel, but rather a passive adjustment means.

Due to this fact, the dimension of the machine cannot be reduced by exploiting the space inside the metering receptacle or vessel in combination with an active use of the plunger.

SUMMARY OF THE INVENTION

The object of the invention is that of providing a method for filling containers with metered quantities of liquid product, which ensures a precise quantity of product introduced in the containers, an easy change over for different containers, by which also the metered quantity of liquid product is changed, and which requires a simple manufactured machine, practical, versatile and whose operation speed is high.

Another object of the invention is to provide a method and machine in which the quantity of the liquid delivered to the metering receptacle does not depend on the dimension of the plunger of the prior art, and the dimension of the whole reservoir is not critical to the quantity of liquid to be supplied to the containers being filled.

Another object is to provide a method and a machine which use the plunger of the prior art as an active element to define the quantity of liquid product inside the metering receptacle.

The above mentioned objects have been obtained, in accordance with the contents of the claims, by means of a method for metering products, in particular liquid product, and for filling containers with metered products, said method including:

feeding products to a reservoir, which is in communication with a metering receptacl, said metering receptacle having an upper part with an opening and a lower part equipped with a discharge pipe directed to a container to be filled, and with valve means situated along said discharge pipe;

operating level changing means for filling said metering receptacle, said level changing means increasing the level of products contained in said reservoir, so as to cause the filling of said metering receptacle with said articles and the definition of a metered quantity of said products inside said metering receptacle;

delivery of said metered quantity of products to said container through said discharge pipe, by opening said valve means;

the method being characterized in that, operation of said means for feeding said metering receptacle includes:
bringing a moving element inside said reservoir;
feeding said products to said reservoir until said products reaches a predetermined level over said opening of said metering receptacle, so as to fill up said metering receptacle;
removing said moving element from said reservoir, so as to lower the level of the products therein below said opening of said metering receptacle.

According to another embodiment of the invention, after having fed the metering receptacle with a quantity of products exceeding the quantity necessary for filling up the receptacle, the method includes:

completing the filling of said metering receptacle with said products, so as to define a metered quantity of said products inside said metering receptacle;

introduction of a moving element into said metering receptacle, so as to make the quantity of products exceeding the quantity necessary to define said metered quantity overflow through said opening of the metering receptacle;

delivering said metered quantity of products to the container through said discharge pipe, by opening said valve means;

transferring the quantity exceeding the metered quantity to a second metering receptacle, said second metering receptacle being set in communication with a second container to be filled, with working cycles of said metering receptacles being alternatively operated in the introduction and delivery steps.

According to another embodiment of the method, after that a moving element has been introduced into the metering receptacle, so as to make the quantity of products exceeding the quantity necessary to define said metered quantity overflow through said opening of the metering receptacle, the quantity exceeding the metered quantity is collected into a collection tank, from which it is reintroduced into the close product introduction circuit.

The method described heretofore is carried out by a machine for metering products, in particular liquid product and for filling containers with metered product, characterized in that it includes:

a reservoir, with a bottom, for feeding products;

a metering receptacle, which is set in communication with said reservoir and with the container to be filled, said metering receptacle having an upper part with an opening and a lower part equipped with a discharge pipe directed to a container to be filled, with valve means situated along said discharge pipe;

a first element, moving between a lowered, filling position, in which it is introduced into the products contained in the reservoir, and a raised, non-filling position, in which it is removed from the products;

the machine being characterized in that it further includes:
a supply duct for cyclically introduce liquid product into said reservoir until a predetermined minimum level, over the opening of said metering receptacle, is reached and in phase relation with the filling lowered position of said first moving element;
sensor means, which detects said minimum level of liquid product in the reservoir and sends a signal for closing said supply duct.

According to a different embodiment of the invention, the machine includes:

a metering receptacle situated inside the reservoir and connected with the container to be filled;

a supply duct which cyclically feeds the metering receptacle with a quantity of liquid product exceeding a metered quantity to be obtained;

a moving element, which is introduced into said metering receptacle, so as to reduce the nominal volume thereof up to a value equal to the metered quantity, due to overflowing of the quantity of products exceeding the metered quantity;

means for collecting the exceeding quantity of products expelled from the metering receptacle;

means for emptying the reservoir from the products, which have overflown therein during the filling of said metering receptacle;

the machine being characterized in that said means for collecting said exceeding quantity of products include a second metering receptacle, which is arranged with respect to the first metering receptacle in such a way that the respective upper openings are aligned and connected to a plate, said second metering receptacle being connected to a relative second moving element and equipped with a respective nozzle, which is a branch of said supply duct, said second metering receptacle being connected to a corresponding second container to be filled and in that it includes interconnecting means for connecting said moving element and second moving element in a determined phase relation, so that when one moving element is introduced into the relative metering receptacle, the other is removed therefrom and vice-versa.

According to a different embodiment of the claimed machine, the machine includes a plurality of metering receptacles arranged in a ring inside the collection tank, said collection tank having a circular base and being set into rotation in synchrony with carrousel means, which move the containers to be filled, so as to place them below the corresponding metering receptacles, said metering receptacles being connected with relative volume reducers, which are driven to move vertically by respective guiding means engaged by a track of a ring-like cam, which is coaxial with the carrousel and fastened thereto.

BRIEF DESCRIPTION OF THE DRAWINGS

The characteristic features of the present invention are pointed out in the following description, taken in conjunction with the accompanying drawings, in which:

FIGS. 11a, 11b, 11c and 11d are the same schematic views of a part of still another embodiment of the proposed machine, in different working steps;

FIGS. 13a, 13b, 13c, 13d show still another embodiment of the machine carrying out the proposed method, in corresponding working steps;

BEST MODES OF CARRYING OUT THE INVENTION

Figure 1:
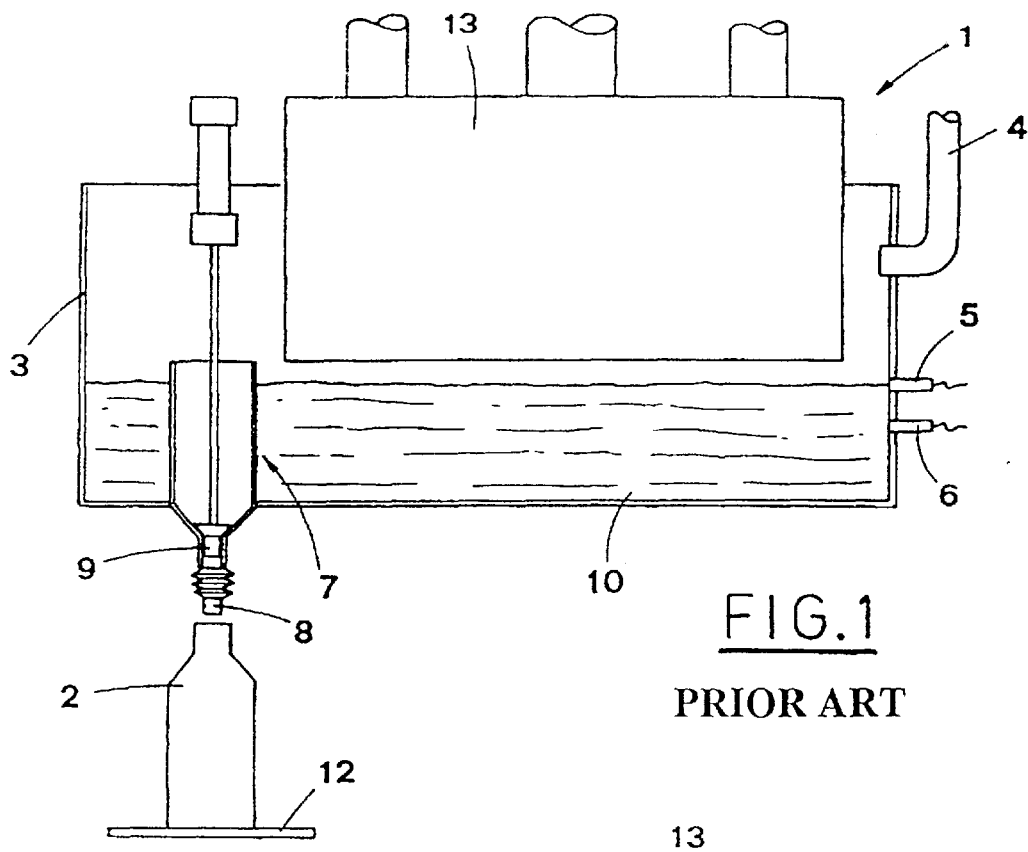
FIG. 1 is a schematic view of a prior art machine for filling containers with a metered quantity of liquid product.
Figure 2:
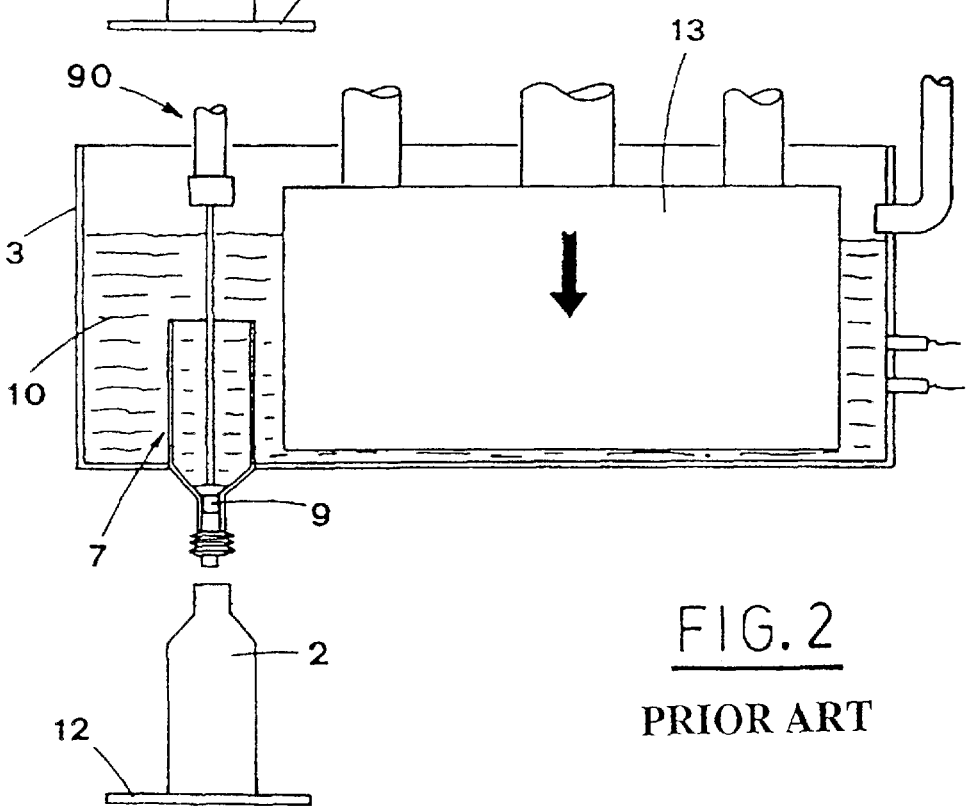
FIGS. 2, 3 and 4 are schematic views of the above mentioned prior art machine, in subsequent working steps.
Figure 3:
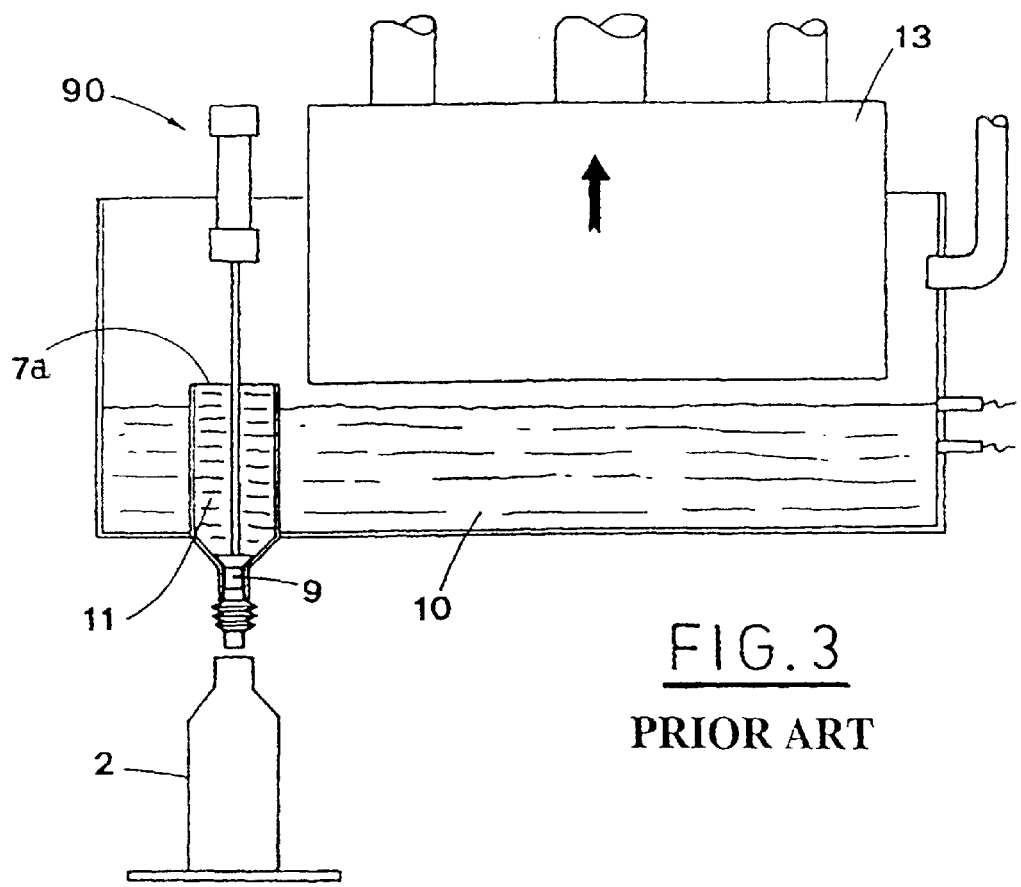
Figure 4:
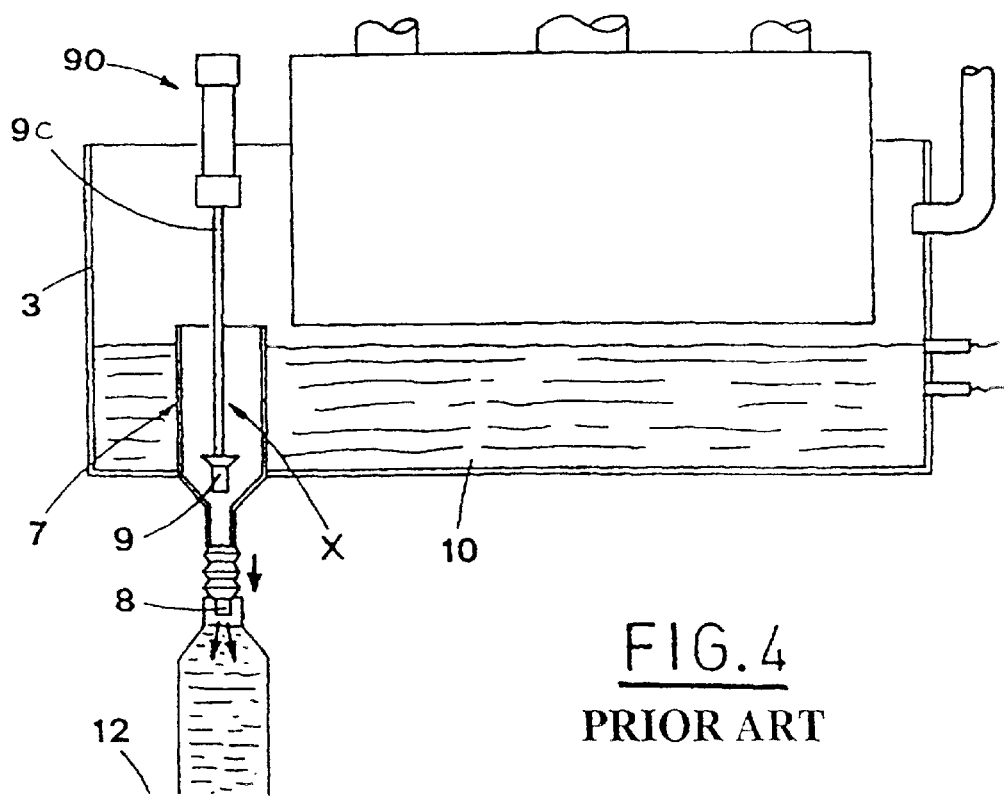

With reference to the above mentioned figures, the reference numeral 1 indicates the machine for filling containers 2, e.g. bottles, with a metered quantity of product, in particular liquid product and the like.

The products referred to in the following will be liquids.

The machine 1 includes a reservoir 3 feeding the liquid product 10 to be introduced to the containers 2.

The reservoir 3 is periodically supplied with the liquid product 10 by a suitable supply duct 4, so as to maintain constantly the level of the products within the range comprised between a maximum and a minimum value, defined by respective sensor means 5 and 6.

A metering receptacle 7, open at the top, is situated inside the reservoir 3.

In its lower part, the metering receptacle 7 features a discharge pipe 8, equipped with valve means 9, e.g. a valve.

For instance, the valve is a cylindrical body 9A, sliding freely inside the discharge pipe 8 and provided with a frusto-conical head 9B, whose conicity is complementary to the conicity of the bottom 7b of the metering receptacle 7.

The valve is operated, e.g. through a stem 9c, by mechanical or pneumatic means, or other known means, generally indicated with reference numeral 90.

The discharge pipe 8 protrudes from the bottom of the reservoir 3 and is aimed at being set in communication with the container 2 to be filled, which is carried by transport means 12 under the reservoir 3.

Figure 5:
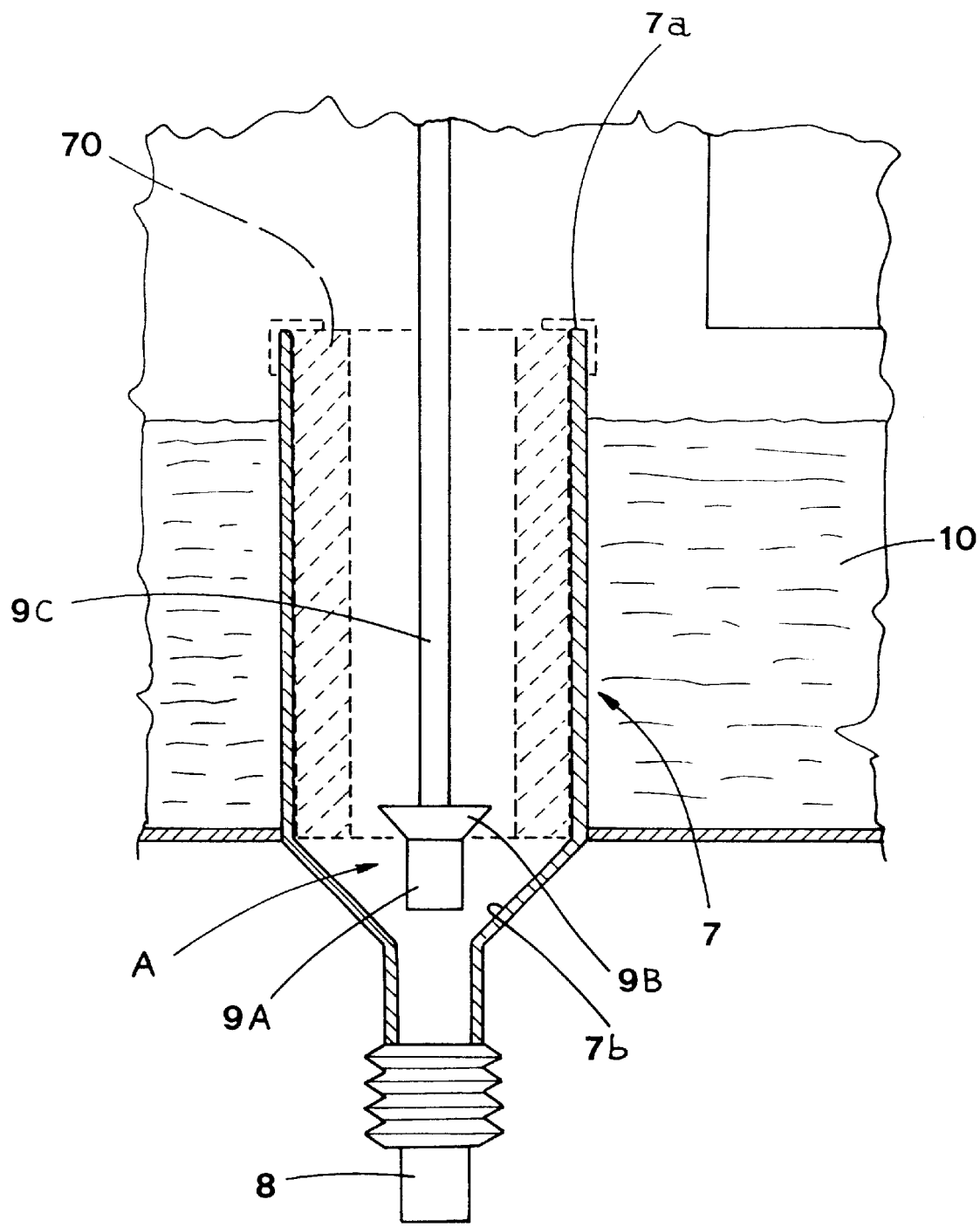
FIG. 5 is an enlarged view of a particular X of FIG. 4.

The delivery is controlled by the opening of the valve means 9: position A (FIG. 5).

Figure 12A:
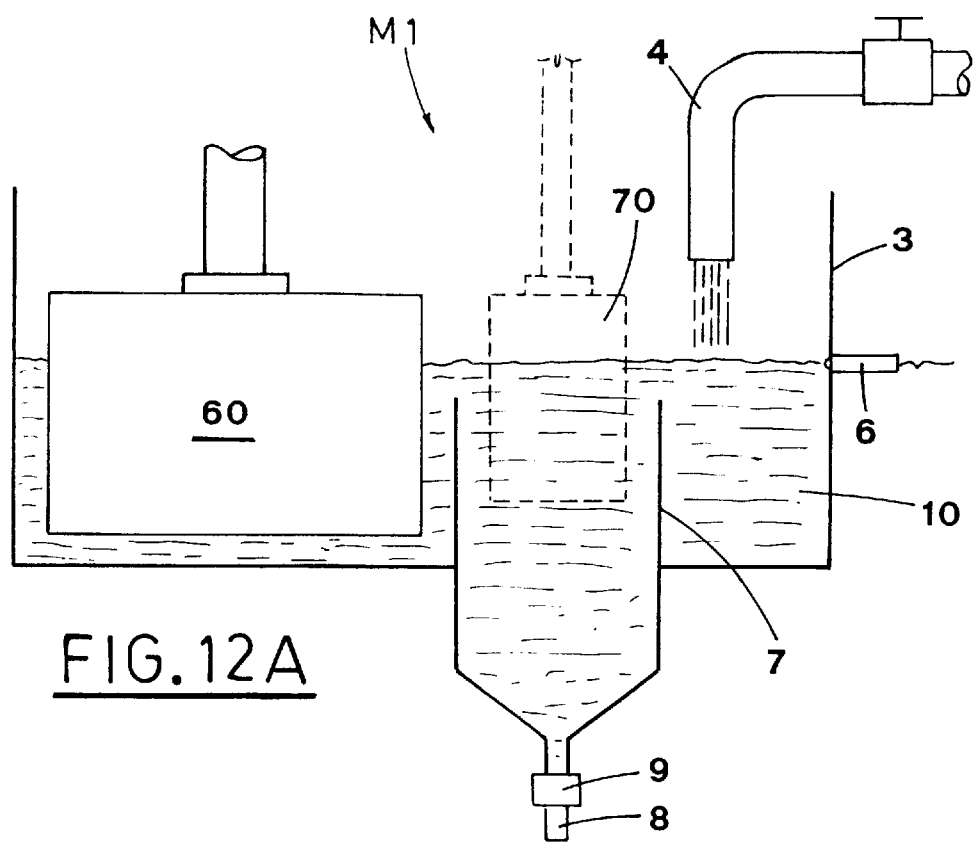
FIGS. 12a, 12b, 12c show yet another embodiment of the machine carrying out the proposed method, in as many working steps.
Figure 12B:
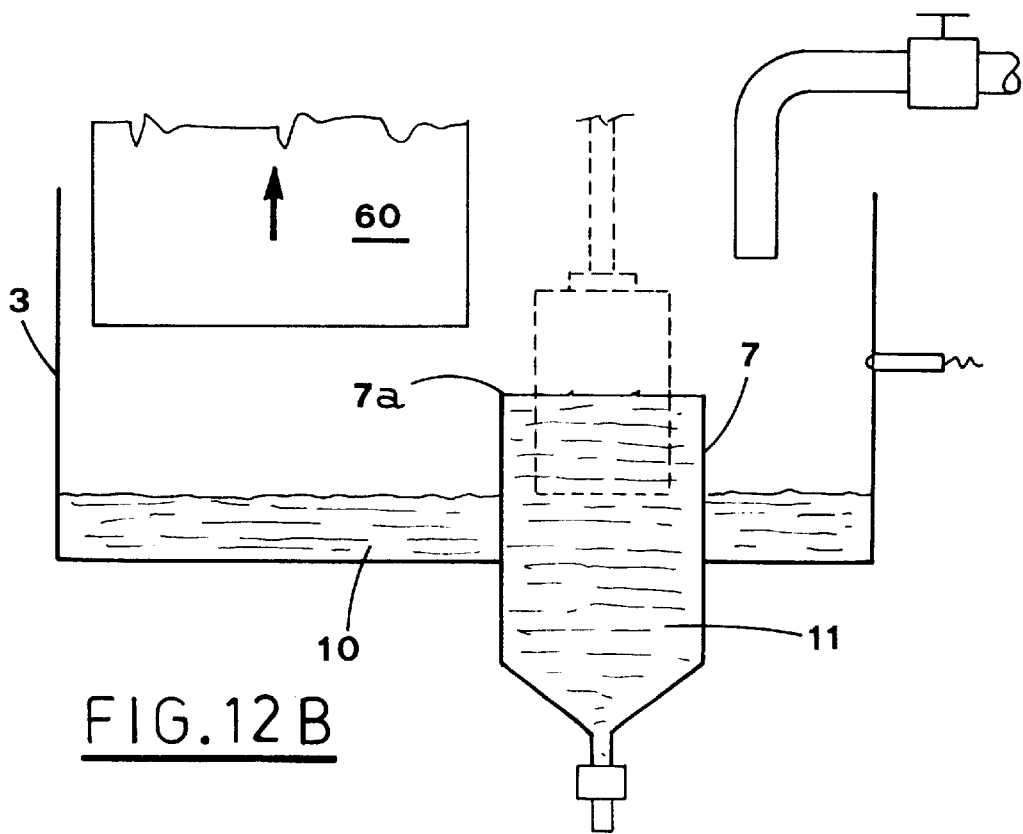
Figure 12C:
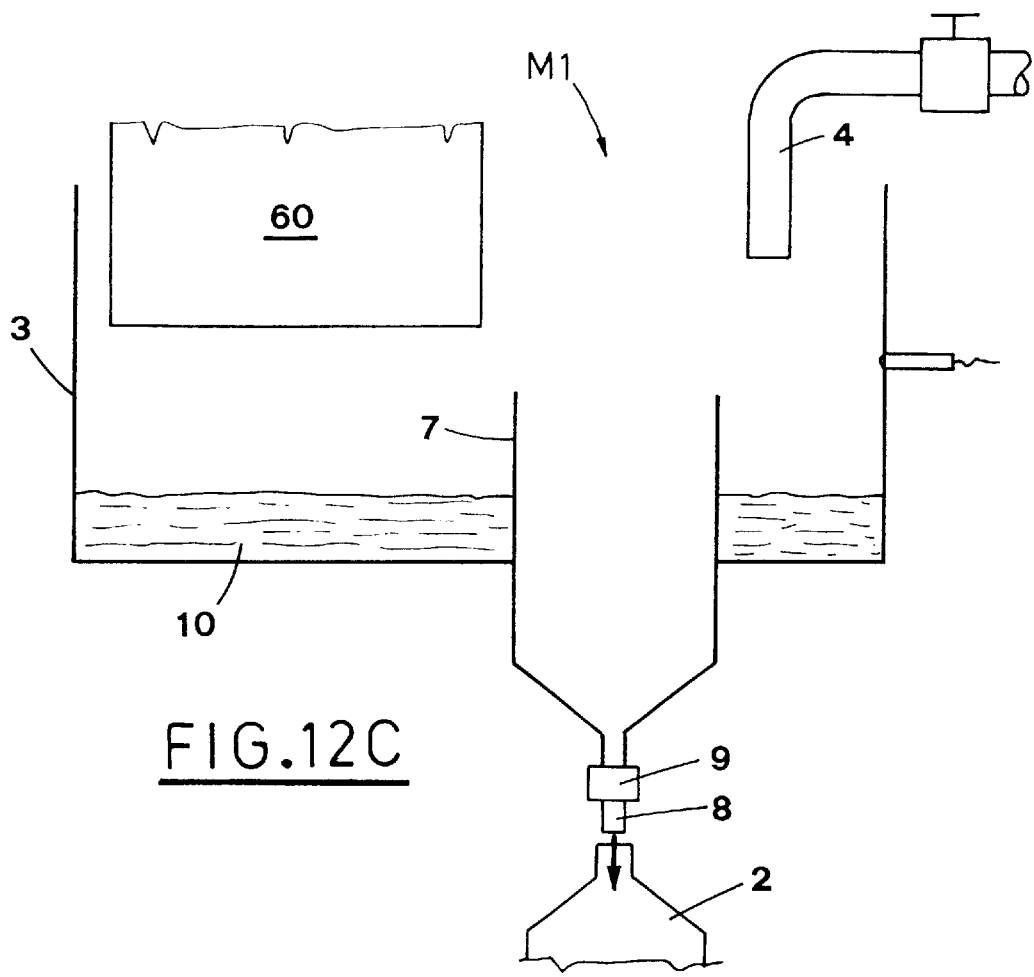

According to the proposed method, carried out by a machine M1, in the form of the embodiment shown in FIGS. 12a, 12b, 12c, a moving element, or volume reducer 60 is introduced into the reservoir 3 and liquid product 10 is fed thereto by the supply duct 4, until the predetermined minimum level detected by the sensor 6 is reached (FIG. 12a).

Afterwards, the supply of the liquid product 10, which have filled also the free space of the metering receptacle 7 through the opening 7a, is cut off.

Then, the volume reducer 60 is raised, so as to be withdrawn from the liquid mass; this causes the lowering of the level of the liquid product in the reservoir 3, while the metering receptacle 7 remains full (FIG. 12b).

In fact, the products contained in the reservoir 3 and the metered quantity 11 contained in the metering receptacle 7 are separated and, after having opened the valve 9, the metered quantity 11 is delivered, through the discharge pipe 8, to the container 2, situated below (FIG. 12c).

According to a possible variant, a first volume reducer 70 (indicated with a broken line) is introduced into the metering receptacle 7, before the products 10 are supplied; the position of the second volume reducer is adjusted, so that the metered quantity 11 is reduced by the desired entity with respect to the nominal capacity of the metering receptacle 7.

In this way, it is possible to adjust the metered quantity 11 in relation to the size of the container 2 and/or desired filling degree.

Figure 12D:
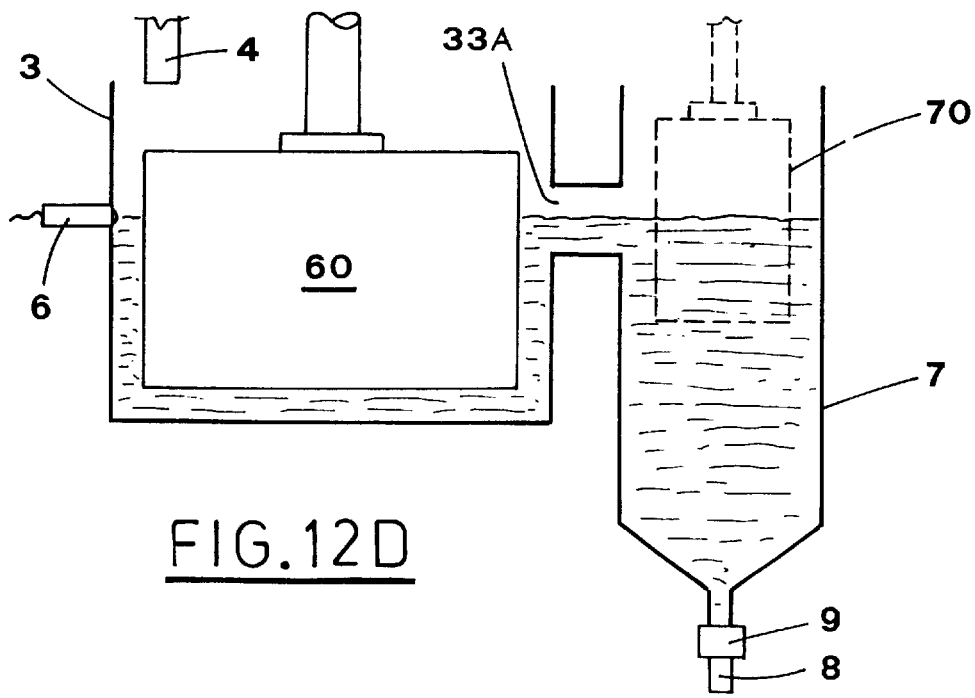
FIG. 12d is a view of a variant of the previous embodiment.

The metering receptacle 7 can be situated outside the reservoir 3; in this case, the metering receptacle 7 is fed by a passage 33A, which connects it to the reservoir 3 (FIG. 12d).

It is clear that only one sensor 6 is needed to define the maximum level, while there is no need to detect a minimum level. Filling the reservoir will last until the maximum level is reached. The control of the machine is simplified since only the reach of the maximum value is to be detected to stop filling the reservoir and raising the volume reducer. Start of the operation includes at the same time lowering the volume reducer 60 and initiating filling the reservoir no matter of any minimum value.

The liquid delivered to the metering receptacle does not depend on the dimension of the volume reducer 60 and does not influences the dimension of the reservoir. Only the filling step will change in relation thereto. In fact the dimension of the volume reducer 60 must be only such that with the maximum level of liquid, the metering receptacle is fully covered by the liquid itself.

According to another embodiment of the proposed method, the products 10 are introduced into a metering receptacle 7, whose capacity is bigger than the metered quantity 11 to be obtained.

The introduction is interrupted when a predetermined minimum level, detected by a sensor 6 and corresponding to a quantity excessive with respect to the metered quantity to be obtained, is reached.

Subsequently, a volume reducer is introduced into the metering receptacle 7 and causes the overflowing of the products 10 contained in the metering receptacle 7.

The introduction of the volume reducer 70 is adjusted, so that only the quantity exceeding the one necessary to obtain the metered quantity 11, overflows.

Then, after the valve means 9 have been opened, the metered quantity 11 is delivered to the container 2 situated below, by the discharge pipe 8.

Upon completion of the delivery, the volume reducer 70 is brought back to the rest position.

It is possible to invert the last two steps, i.e. the volume reducer 70 is firstly removed and then the metered quantity 11 is delivered to the container 2.

There are steps for collecting the exceeding quantity of products 10 expelled from the metering receptacle 7.

In a first case, the exceeding quantity is sent to a second metering receptacle 77, e.g. identical with the first one, aimed at filling a second container 2.

It is possible to use the exceeding quantity of one receptacle for filling the other, if the working cycles of the two metering receptacles 7, 77 are suitably staggered, so that when one receptacle is being filled with the products, the other is delivering the products, and vice-versa.

In a second case, the exceeding quantity is sent to a collection tank 113, from which it is reintroduced into the looped circuit.

FIGS. 13a, 13b, 13c, 13d show a machine M2, which includes two metering receptacles 7, 77, with staggered working cycles.

In this machine M2, the metering receptacles 7, 77 are arranged in such a way that their openings 7a, 77a are aligned and connected by a plate 33, which, substantially constitutes a bottom of a tank 30.

A rocker lever 22 is articulated to a stationary structure 20 at a pivot 21.

The opposite ends of the rocker lever 22 are engaged by rods 23, 24, which are guided to slide vertically by relative bushes 25, 26, joined to the stationary structure 20.

The lower extremities of the rods 23, 24 are fastened to volume reducers 70, 770, which are situated over the metering receptacles 7, 77, and brought, by the movement of the rocker lever 22, alternatively, inside and outside the respective metering receptacle 7, 77.

Filling nozzles, 41, 42, which are branches of the supply duct 4 for introducing liquid product 10, enter the respective metering receptacle 7, 77.

Each nozzle 41, 42 features a relative valve 91, 92.

Each metering receptacle 7, 77 is equipped with a relative sensor 6 and with the usual discharge pipe 8 and a valve 9.

Figure 13A:
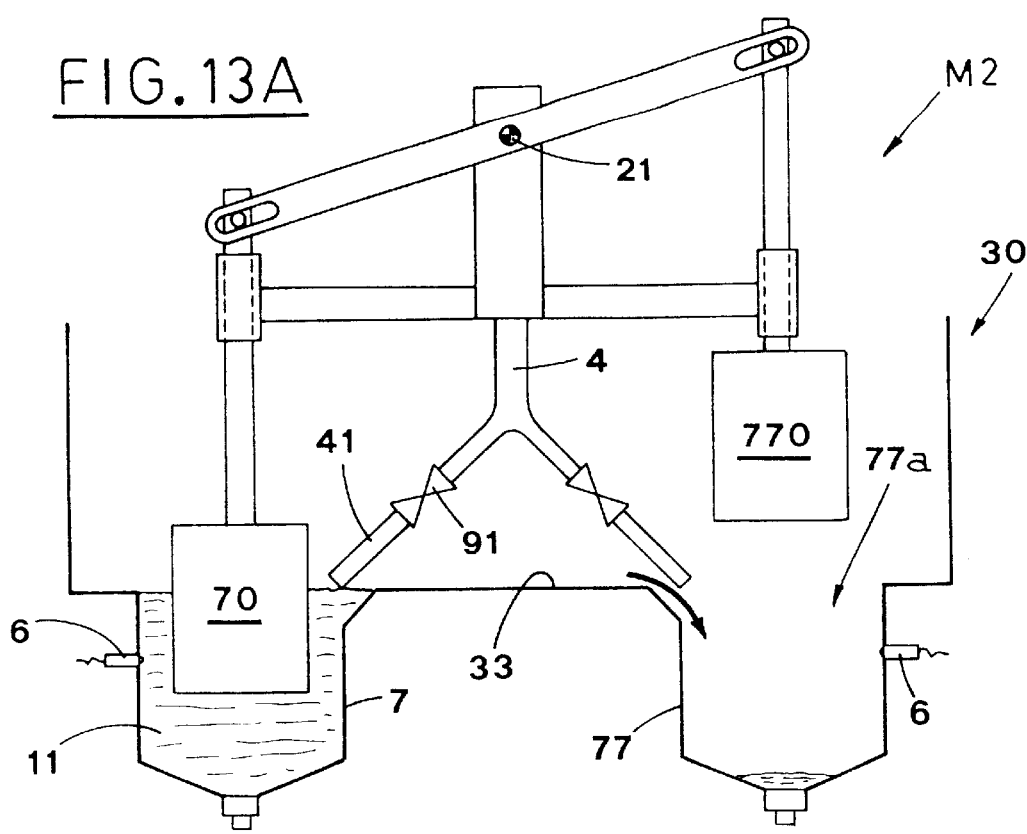

FIG. 13a shows a step, in which the metering receptacle 7 contains the metered quantity 11 and the exceeding part has overflown, due to the volume reducer 77, and passing over the plate 33, into the second metering receptacle 77.

Figure 13B:
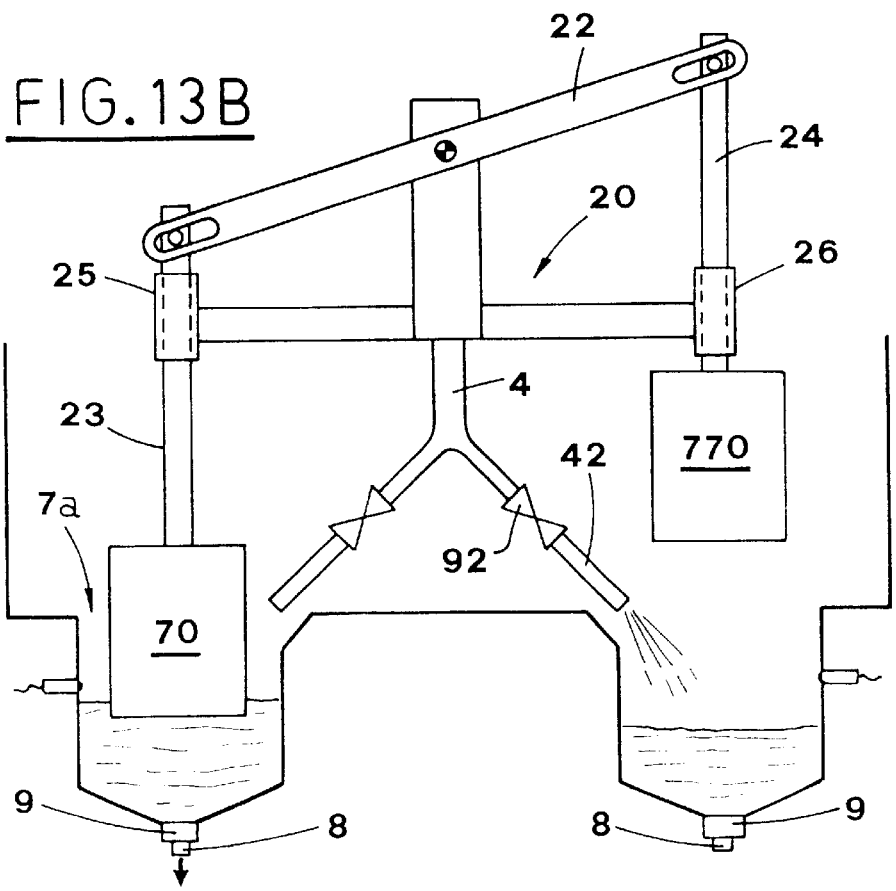

FIG. 13b shows the step, during which the metered quantity 11 of the metering receptacle 7 is delivered and, at the same time, the product is introduced into the metering receptacle 77 through the nozzle 42.

FIG. 13c shows the end of the above mentioned step, when the delivery from the metering receptacle 7 and filling of the metering receptacle 77, detected by the sensor 6, are completed.

In FIG. 13d, the rocker lever 22 is moved to the opposite position, so the first volume reducer 70 is raised out from the first metering receptacle 7 and the second volume reducer 770 is introduced into the second metering receptacle 77, which results in overflowing of the exceeding product present in the latter and conveying thereof to the first metering receptacle 7.

Figure 14:
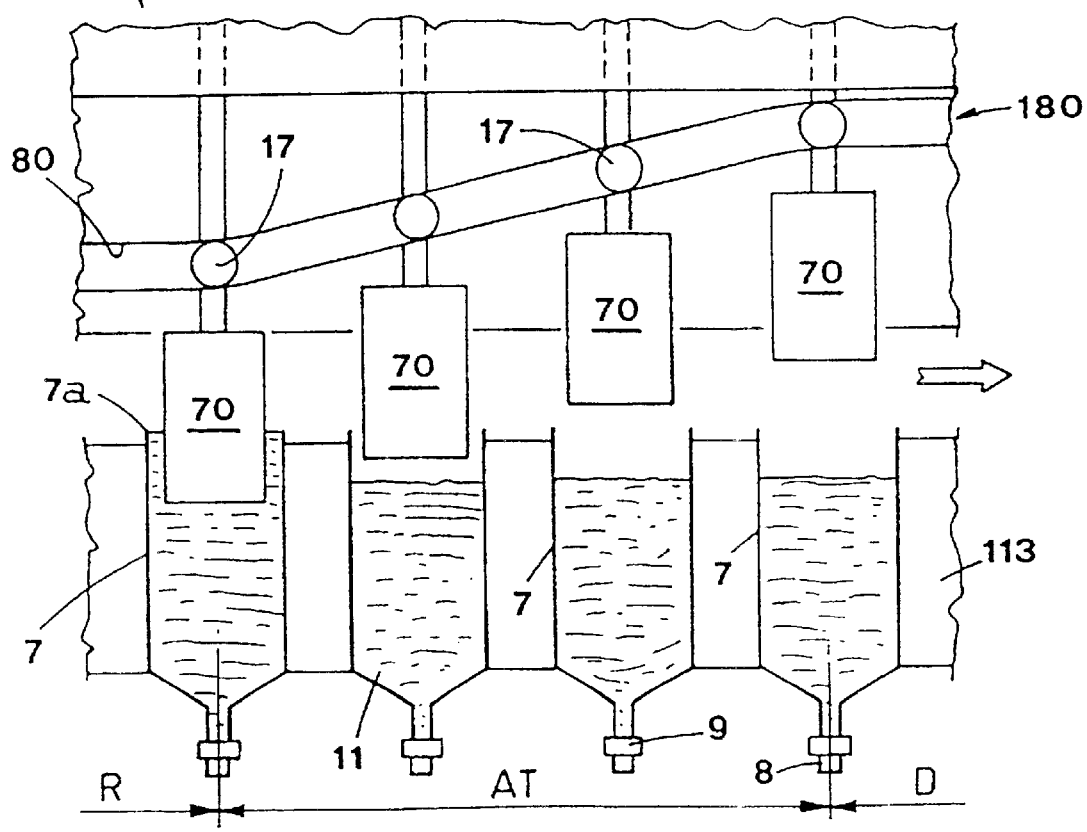
FIG. 14 is a view of a part of a further embodiment of a machine carrying out a corresponding variant of the proposed method.

FIGS. 14 shows partially a machine M3, which includes the collection tank 113 and in which the metered quantity 11 is delivered after the first volume reducer 70 has been removed.

The machine M3 is carrousel-like and includes a series of metering receptacles 7 arranged in a ring inside the collection tank 113, which has a circular base.

Otherwise, the metering receptacles can be situated outside the machine and connected to the collecting tank 113 by channels, as shown in FIG. 13d.

The machine includes a platform, known, and not shown, set in coaxial relation with the ring of the metering receptacles 7 and the collection tank 113.

The containers to be filled are fed to the platform and are placed under the respective metering receptacles 7.

Over each of the metering receptacle 7, there is a respective volume reducer 70, which is operated to move vertically by guiding means 17, e.g. roller means engaged by a track 80 of a ring-like cam 180, which is coaxial with the carrousel and fastened thereto.

The group including the containers carrying platform, tank 13, metering receptacles 7, and volume reducer 70 is driven into rotation about its common axis, therefore the guiding means 17 follow the track 80.

Consequently the volume reducers 70 are raised and lowered with respect to the respective metering receptacles 7 situated below, in phase relation with the operation of the supply and delivery means, as has been already described.

Figure 6:
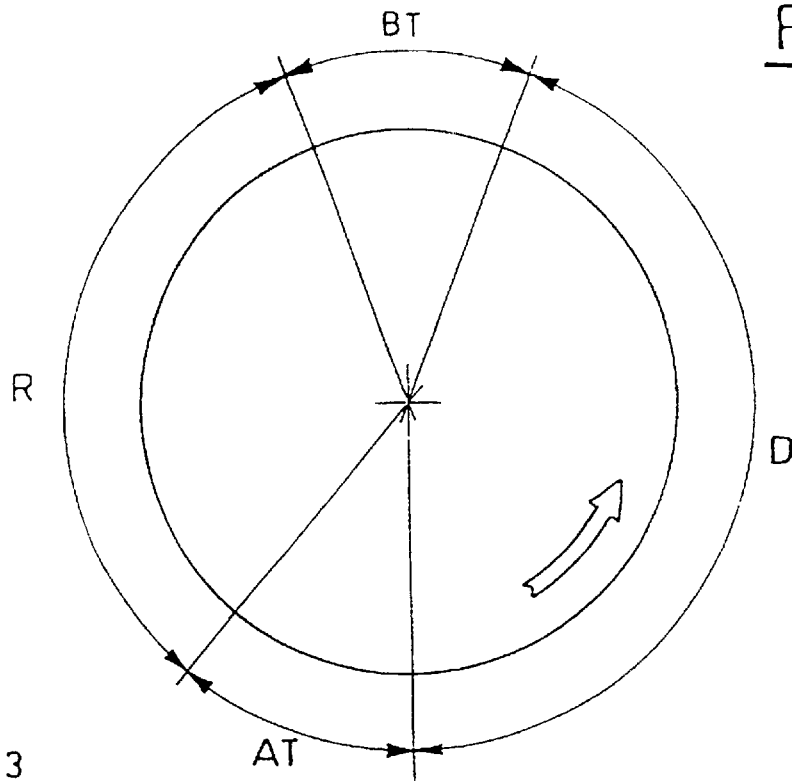
FIG. 6 is a circular diagram of the working steps of the machine of FIG. 3.

For clarity, FIG. 6 shows a circular scheme of the consecutive steps, which follow one another according to the indicated rotation direction: introduction of the volume reducers 70 (arc BT) into the metering receptacles 7; filling of the metering receptacles metering receptacle 7, by direct or indirect introduction, with an excessive quantity of the products 10 until they overflow (arc R); raising of the volume reducers 70 (arc AT); delivery of the metered quantity (arc D).

It is to be pointed out that it is possible to adjust initially the metered quantity 11, in accordance with the containers size as changed. Therefore, the volume of the containers can vary and this does not require any change of the metering receptacles 7; in fact, it is enough to only adjust the stoke of the volume reducers.

With this embodiment of the method and machine, the volume reducer is an active element inside the metering receptacle. The advantages include reducing dimension of the device, which is a basic requirement of the configuration of FIG. 14, and no necessity of considering level ranges, since the metering receptacles are always filled with the same quantity of liquid product if they are approximately filled up to the rim.

Moreover this solution avoid a double adjustment at starting operation, i.e. adjustment of the first mobile volume reducer and of second stationary volume reducer inside the metering receptacles, since only one reducer has to be adjusted for each metering receptacles.

This is of particular advantage when many metering receptacles are used, as in FIG. 14.

Figure 8:
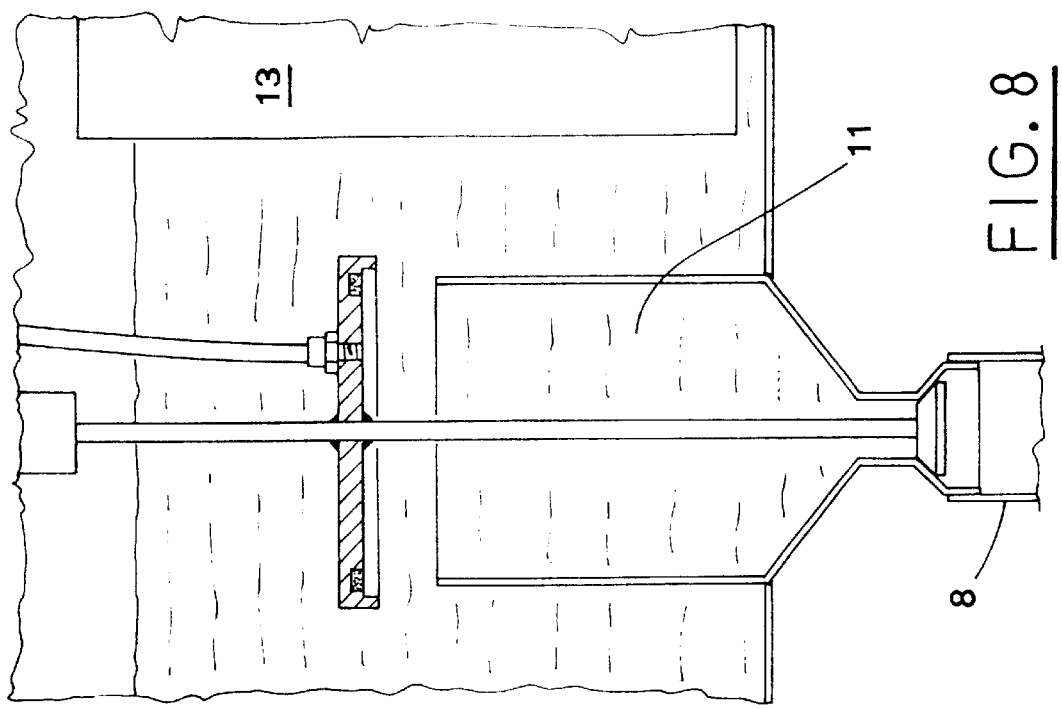
FIGS. 7, 8 and 9 are schematic views of a part of a machine, proposed in yet another embodiment, in different working steps.
Figure 7:
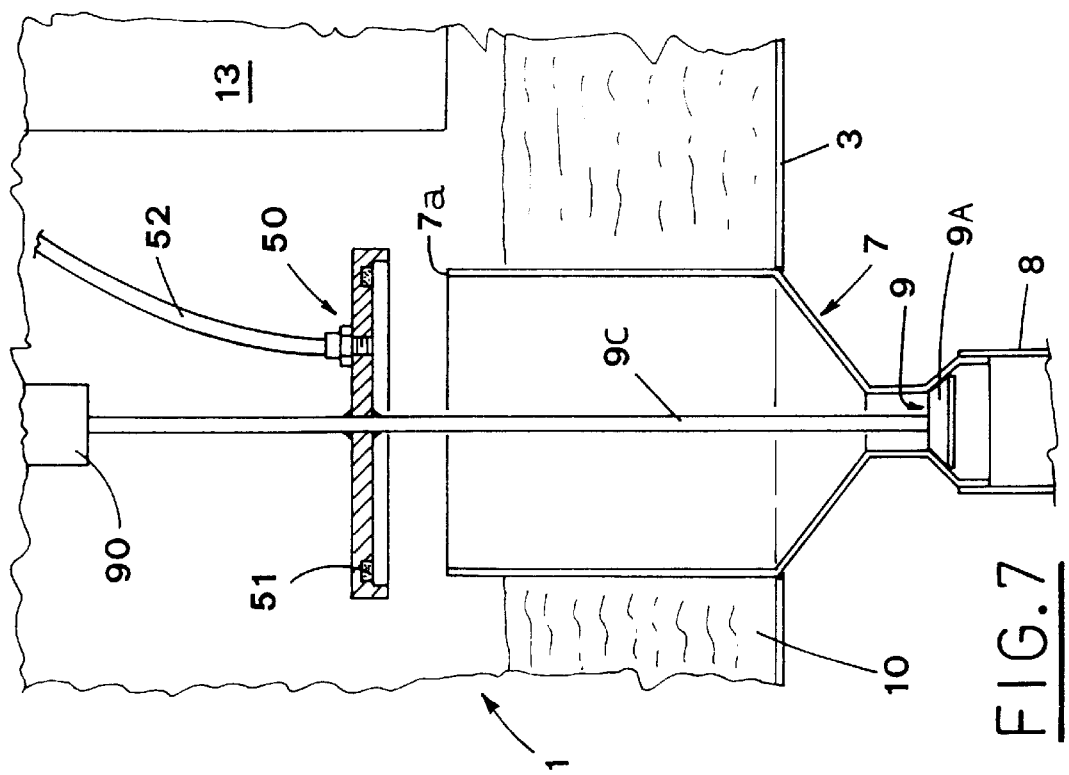
Figure 9:
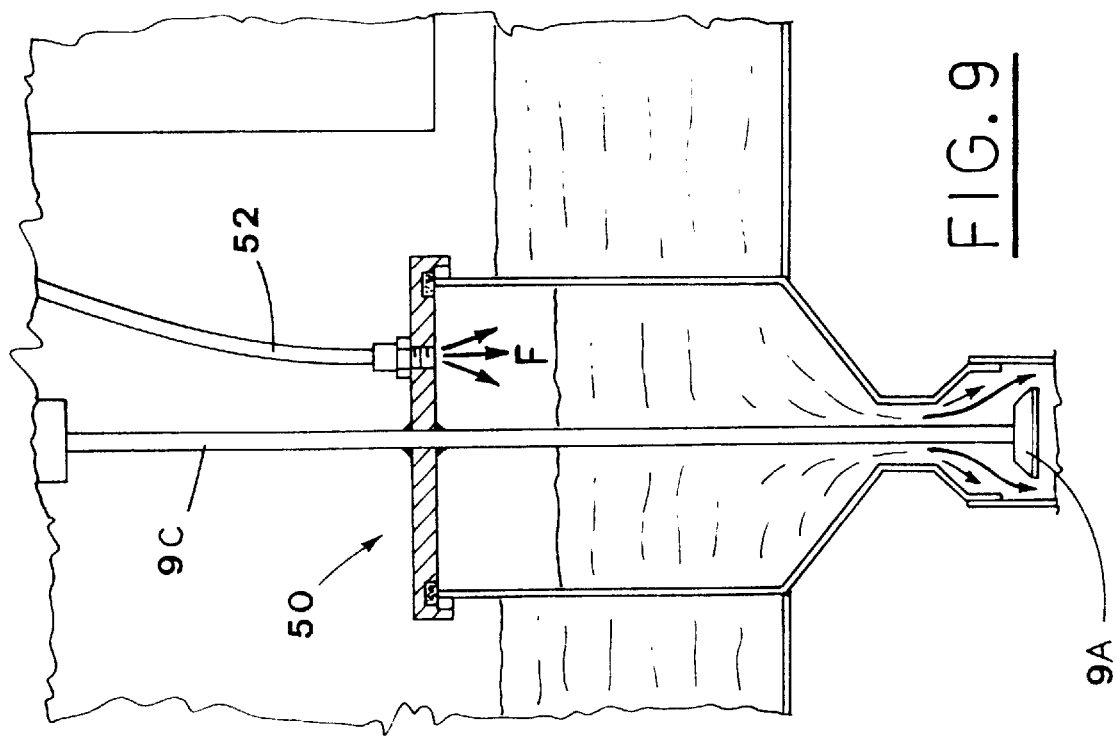

According to the embodiment shown in FIGS. 7, 8 and 9, a cover 50, complementary to the opening 7a of the metering receptacle 7, is fastened to the stem 9c.

The cover 50 features tightening means 51 and a hose 52 which can be connected to a delivery of an air compressor, not shown.

When the valve means 9 are closed (FIGS. 7, 8), the cover is raised with respect to the opening 7a; when the valve means 9 are opened, the cover closes tightly the opening 7a (FIG. 9).

The delivery is controlled by the opening of the valve means 9, which causes closing of the opening 7a by the cover 50; the hose 52 is filled with air under pressure (arrows 7 of FIG. 9), in time relation with the closing of the opening 7a, which facilitates and speeds up the emptying of the metering receptacle 7.

Figure 10:
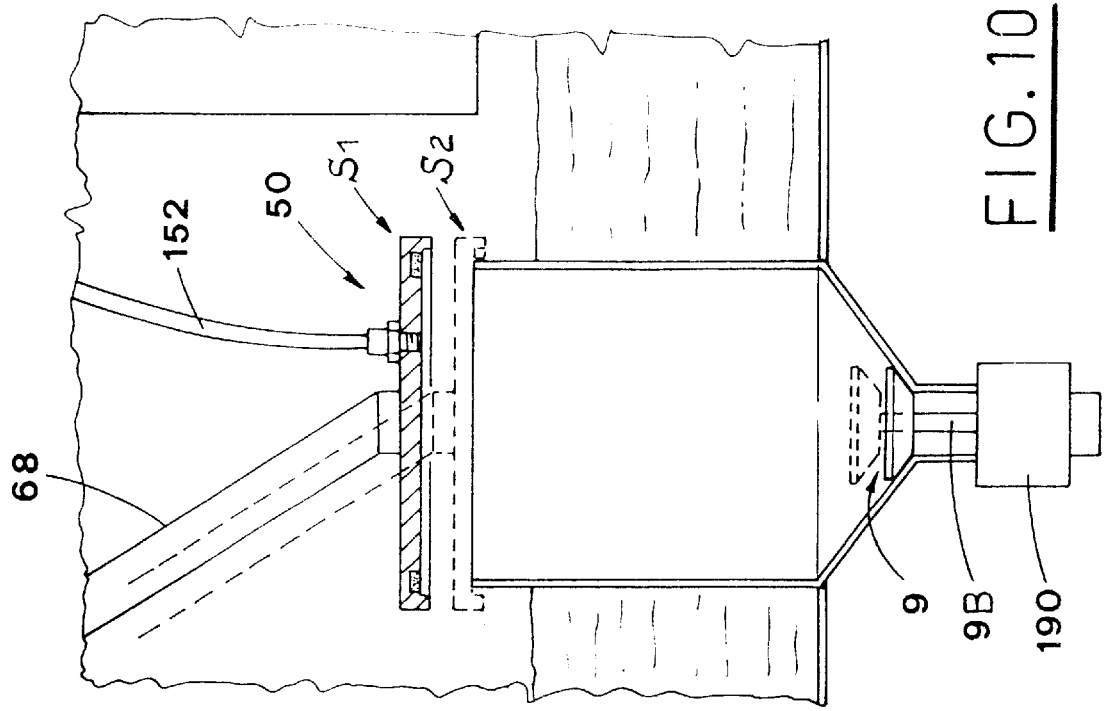
FIG. 10 is an analogous schematic view of a different embodiment of the part of the machine shown in FIGS. 7, 8 and 9.

FIG. 10 shows a variant for the operation of the cover 50.

According to this variant, the valve means 9 are operated by an actuator 190, while the cover 50 is operated by an arm 68, which moves the cover between two extreme positions, raised S1 and lowered S2, respectively.

The lowered position determines the tight closure of the opening 7a and is determined in time relation with the opening of the valve means 9 (position indicated with broken line in FIG. 10).

In this situation, like in the previous case, the emptying of the metering receptacle 7 is facilitated and sped up, because the free surface of the liquid contained therein is subjected to the pressure, which is imposed by a hose 152, joined to the cover 50 and connected to the delivery of an air compressor (not shown).

With reference to FIGS. 11a, 11b, 11c, 11d, the opening 7a of the metering receptacle 7 is situated flush with the bottom 3a of the reservoir 3.

The cover 50, complementary to the opening 7a, when joined thereto, makes the closure tight; the cover 50 features a hose 52 which can be connected to the delivery of a compressed gas source, e.g. air.

A shaft 40, operated by known means (e.g. mechanical, pneumatic, or other known means), is fastened to the cover, so as to move it to a raised position S, in which it is disengaged from the opening 7a (FIG. 11b), and to a lowered position A, in which it closes tightly the metering receptacle 7.

With reference to FIG. 11a, the cover 50 is in the lowered position A, the metering receptacle 7 is empty and the valve 9 is closed.

The raising of the cover 50, (FIG. 11b) with the valve 9 closed, causes the metering receptacle 7 to be filled up with the liquid product 10, due to gravity.

Figure 11D:
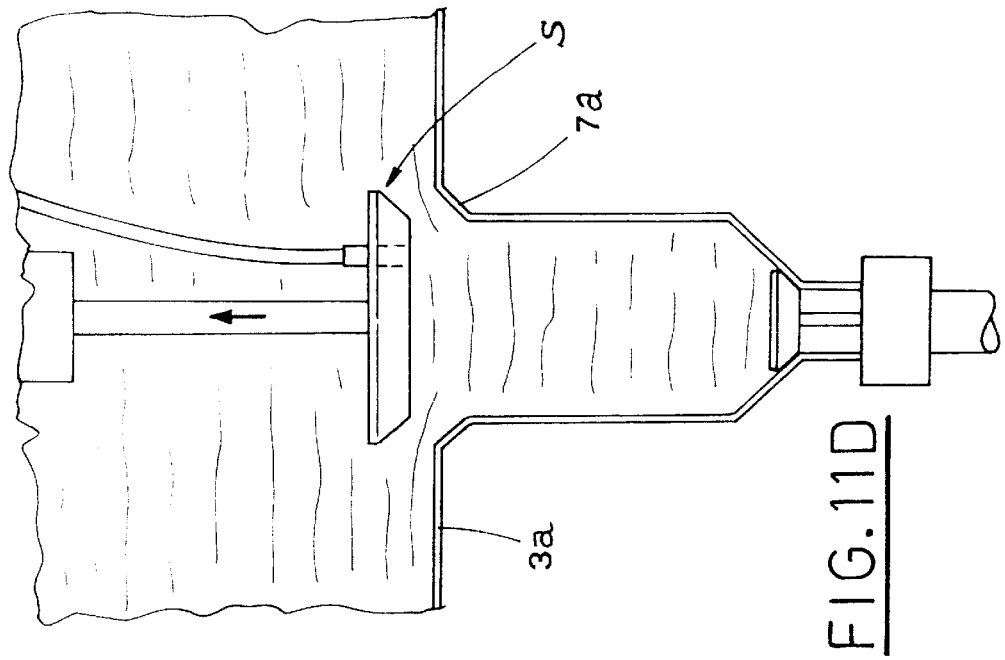
Figure 11C:
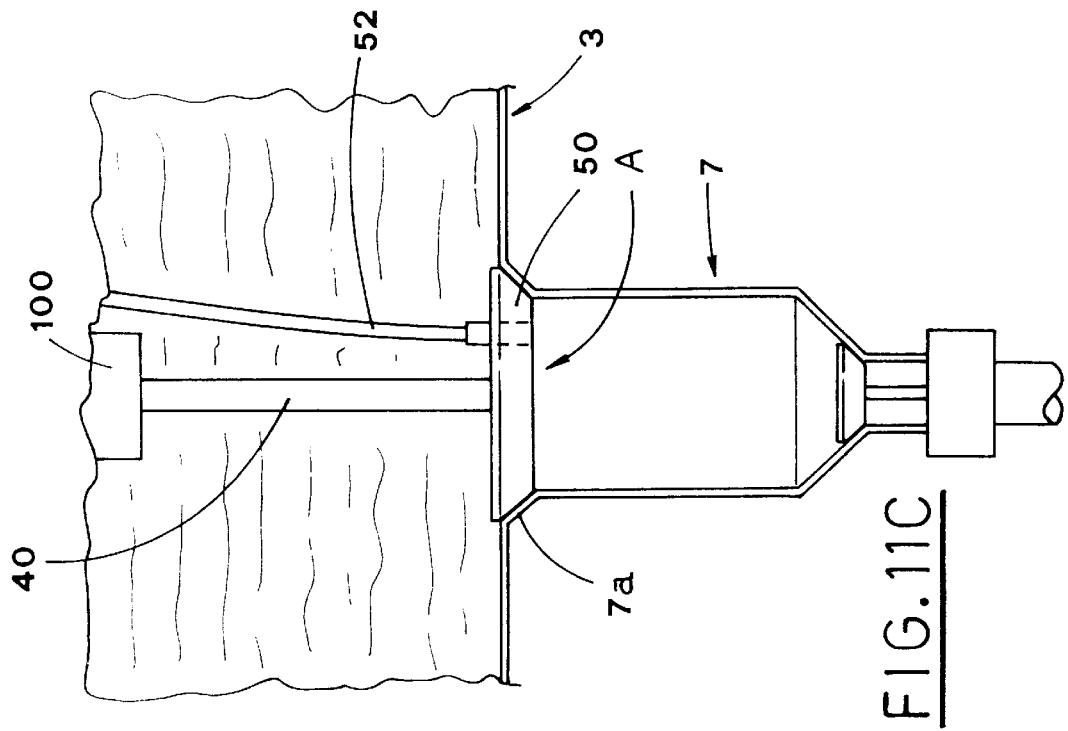

After having been filled, the metering receptacle 7 is closed (lowered position A of the cover: FIG. 11c).

Thus, a metered quantity 11 of liquid product 10 is defined inside the metering receptacle 7.

At this point, it is possible to deliver the metered quantity 11 of liquid product to the container dwelling under the metering receptacle.

The delivery is caused by the opening of the valve 9 and simultaneous setting the hose 52 under pressure, which generates a pressure on the free surface L of the product contained in the metering receptacle.

This allows and speeds up the emptying of the metering receptacle 7.

It is to pointed out that this result is obtained by a machine, whose construction and operation are simple.

The proposed method and the machine carrying it out, can be used for filling containers with more or less viscous liquid product, or granular and/or powder products.

It is obvious that the described machines, moreover, illustrated in a schematic way, are only examples which point out some of many possibilities.

It is understood that what above has been described as a mere, not limitative example, therefore possible constructive variants remain within the protective scope of the present technical solution, as described above and claimed hereinafter.

What is claimed is:

1. A method for metering products, in particular liquid product, and for filling containers with metered products, said method including:

feeding products (10) to a reservoir (3), which is in communication with a metering receptacle (7), said metering receptacle (7) having an upper part with an opening (7a) and a lower part equipped with a discharge pipe (8) directed to a container (2) to be filled, and with valve means (9) situated along said discharge pipe (8);

operating level changing means for filling said metering receptacle, said level changing means increasing the level of products (10) contained in said reservoir (3), so as to cause the filling of said metering receptacle (7) with said articles (10) and the definition of a metered quantity (11) of said products inside said metering receptacle (7);

delivery of said metered quantity (11) of products to said container (2) through said discharge pipe (8), by opening said valve means (9);

the method being characterized in that, operation of said means for feeding said metering receptacle includes:
bringing a moving element (60) inside said reservoir;
feeding said products to said reservoir until said products reaches a predetermined level over said opening (7a) of said metering receptacle (7), so as to fill up said metering receptacle;
removing said moving element from said reservoir, so as to lower the level of the products (10) therein below said opening (7a) of said metering receptacle (7).

2. A method according to claim 1, characterized in that, said metering receptacle is situated inside said reservoir (3).

3. A method according to claim 1, characterized in that, said metering receptacle is situated outside said reservoir (3), and is connected to said reservoir (3) by a passage (33A).

4. A method according to claim 1, characterized in that it includes detecting, by sensor means (6), said predetermined level of said products (10) inside the reservoir (3), and determining interruption of said products supply when said predetermined level has been reached.

5. A method according to claim 1, characterized in that it includes introduction of a second moving element (70) into said metering receptacle (7), before introduction of products (10), and adjusting the position of said second moving element, so that said metered quantity (11) is reduced by a desired entity with respect to the nominal volume of said metering receptacle (7).

6. A method according to claim 1, characterized in that the free surface of the products in the metering receptacle (7) are set under pressure in phase relation to the delivery of the metered quantity to said container.

7. A method for metering liquid product and for filling containers with metered liquid product, the method including:

feeding a metering receptacle (7) with a quantity of products exceeding the quantity necessary for filling up said receptacle, said metering receptacle (7) having an upper part with an opening (7a) and a lower part equipped with a discharge pipe (8) directed to a container (2) to be filled, and with valve means (9) situated along said discharge pipe (8);

completing the filling of said metering receptacle (7) with said products, so as to define a metered quantity of said products inside said metering receptacle (7);

the method being characterized in that it includes:
introduction of a moving element (70) into said metering receptacle (7), so as to make the quantity of products (10) exceeding the quantity necessary to define said metered quantity (11) overflow through said opening (7a) of the metering receptacle (7);

delivering said metered quantity of products to the container (2) through said discharge pipe (8), by opening said valve means (9);

transferring the quantity exceeding the metered quantity to a second metering receptacle (77), said second metering receptacle (77) being set in communication with a second container to be filled, with working cycles of said metering receptacles (7,77) being alternatively operated in the introduction and delivery steps.

8. A method according to claim 7, characterized in that said second moving element (70) is introduced into said metering receptacle (7) before being fed with the products (10) and feeding the metering receptacle (7) continues until the quantity exceeding the metered quantity (11) overflows.

9. A method according to claim 7, characterized in that said second moving element (70) is withdrawn from the metering receptacle (7) before the metered quantity (11) is delivered, which results in lowering of the level of said metered quantity therein.

10. A method for metering liquid product and for filling containers with metered liquid product, the method including:

feeding a metering receptacle (7) with a quantity of products exceeding the quantity necessary for filling up said receptacle, said metering receptacle (7) having an upper part with an opening (7a) and a lower part equipped with a discharge pipe (8) directed to a container (2) to be filled, and with valve means (9) situated along said discharge pipe (8);

completing the filling of said metering receptacle (7) with said products, so as to define a metered quantity of said products inside said metering receptacle (7);

the method being characterized in that it includes:

introduction of a moving element (70) into said metering receptacle (7), so as to make the quantity of products (10) exceeding the quantity necessary to define said metered quantity (11) overflow through said opening (7a) of the metering receptacle (7);

delivering said metered quantity of products to the container (2) through said discharge pipe (8), by opening said valve means (9);

includes transferring the quantity exceeding the metered quantity to a collection tank (113), from which it is reintroduced into the close product introduction circuit.

11. A machine for metering products, in particular liquid product and for filling containers with metered products, characterized in that it includes:

a reservoir (3), with a bottom (3a), for feeding products (10);

a metering receptacle (7), which is set in communication with said reservoir (3) and with the container (2) to be filled, said metering receptacle (7) having an upper part with an opening (7a) and a lower part equipped with a discharge pipe (8) directed to a container (2) to be filled, with valve means (9) situated along said discharge pipe (8);

a first element (60), moving between a lowered, filling position, in which it is introduced into the products (10) contained in the reservoir (3), and a raised, non-filling position, in which it is removed from the products;

the machine being characterized in that it further includes:

a supply duct (4) for cyclically introduce liquid product (10) into said reservoir (3) until a predetermined minimum level, over the opening (7a) of said metering receptacle (7), is reached and in phase relation with the filling lowered position of said first moving element (60);

sensor means (6), which detects said minimum level of liquid product (10) in the reservoir (3) and sends a signal for closing said supply duct (4).

12. A machine according to claim 11, characterized in that it includes a cover (50), complementary to said opening (7a) of said metering receptacle (7) and featuring sealing means (51) and a hose (52, 152) which can be connected to an air compressor, said cover (50) being moved between a position in which it is disengaged from the opening (7a) and a position in which it closes said opening (7a) in phase relation with the delivery of the metered quantity of products to said container, so as to set the free surface of said metering receptacle (7) under pressure.

13. A machine according to claim 11, characterized in that said cover (50) is integral with a stem (9C), which operates said valve means (9).

14. A machine according to claim 11, characterized in that said cover (50) is operated, by an arm (68), in phase relation with the activation and deactivation of said valve means.

15. A machine for metering products, in particular liquid product, and for filling containers with metered products, the machine including:

a metering receptacle (7), situated inside a reservoir and connected with the container (2) to be filled, said metering receptacle (7) having an upper part with an opening (7a) and a lower part equipped with a discharge hose (18), with valve means (9) situated along said discharge hose (18);

a supply duct (4) which cyclically feeds said metering receptacle (7) with a quantity of said liquid product (10) exceeding a metered quantity to be obtained, so as to define a metered quantity of products inside the metering receptacle (7) to be delivered to said container through said discharge hose (18);

a moving element (70), which is introduced into said metering receptacle (7), so as to reduce the nominal volume thereof up to a value equal to the metered quantity (11), said moving element thus causing overflowing of the quantity of products exceeding the metered quantity (11), through said opening (7a) of the metering receptacle (7);

means for collecting the exceeding quantity of products (10) expelled from the metering receptacle (7);

means for emptying the reservoir from the products, which have overflown therein during the filling of said metering receptacle;

the machine being characterized in that said means for collecting said exceeding quantity of products (10) include a second metering receptacle (77), which is arranged with respect to the first metering receptacle (7) in such a way that the respective upper openings (7a, 77a) are aligned and connected to a plate (33), said second metering receptacle (77) being connected to a relative second moving element (770) and equipped with a respective nozzle (42), which is a branch of said supply duct (4), said second metering receptacle (77) being connected to a corresponding second container to be filled and in that it includes interconnecting means for connecting said moving element (70) and second moving element (770) in a determined phase relation, so that when one moving element is introduced into the relative metering receptacle (7), the other is removed therefrom and vice-versa.

16. A machine according to claim 15, characterized in that it includes sensor means (6), which detects said minimum level of liquid product (10) introduced into the metering receptacle (7) and sends a signal for closing said supply duct (4).

17. A machine according to claim 15, characterized in that said moving element (70) and second moving element (770) include volume reducers (70, 770), that said interconnecting means of said volume reducers (70, 770) include a rocker lever (22), articulated centrally to a stationary structure (20) in a pivot (21), with the opposite ends of said rocker lever (22) being engaged by rods (23, 24), which are fastened to said volume reducers (70, 770) and are guided to slide vertically by relative bushes (25, 26), joined to the stationary structure (20).

18. A machine for metering products, in particular liquid product, and for filling containers with metered products, the machine including:
    a metering receptacle (7), situated inside a reservoir and connected with the container (2) to be filled, said metering receptacle (7) having an upper part with an opening (7a) and a lower part equipped with a discharge hose (18), with valve means (9) situated along said discharge hose (18);
    a supply duct (4) which cyclically feeds said metering receptacle (7) with a quantity of said liquid product (10) exceeding a metered quantity to be obtained, so as to define a metered quantity of products inside the metering receptacle (7) to be delivered to said container through said discharge hose (18);
    a moving element (70), which is introduced into said metering receptacle (7), so as to reduce the nominal volume thereof up to a value equal to the metered quantity (11), said moving element thus causing overflowing of the quantity of products exceeding the metered quantity (11), through said opening (7a) of the metering receptacle (7);
    means for collecting the exceeding quantity of products (10) expelled from the metering receptacle (7);
    means for emptying the reservoir from the products, which have overflown therein during the filling of said metering receptacle;
    the machine being characterized in that it includes a plurality of metering receptacles (7) arranged in a ring inside the collection tank (113), said collection tank (113) having a circular base and being set into rotation in synchrony with carrousel means, which move the containers to be filled, so as to place them below the corresponding metering receptacles (7), said metering receptacles (7) being connected with relative volume reducers (70), which are driven to move vertically by respective guiding means (17) engaged by a track (80) of a ring-like cam (180), which is coaxial with the carrousel and fastened thereto.

19. A machine according to claim 18, characterized in that said guiding means are rollers.

* * * * *